United States Patent
Yoshimoto et al.

(10) Patent No.: US 6,986,064 B2
(45) Date of Patent: Jan. 10, 2006

(54) METHOD, RECORDING MEDIUM AND APPARATUS FOR POWER SAVING CONTROL VIA DETECTION OF USAGE PATTERN BASED ON STORED HISTORY AND ACCOUNTING OF A SPIN DOWN COST

(75) Inventors: Shinichi Yoshimoto, Kawasaki (JP); Hiroshi Yamada, Kawasaki (JP); Yasushi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 09/791,826

(22) Filed: Feb. 26, 2001

(65) Prior Publication Data

US 2001/0044907 A1 Nov. 22, 2001

(30) Foreign Application Priority Data

May 19, 2000 (JP) .......................................... 2000-147906

(51) Int. Cl.
*G06F 1/32* (2006.01)

(52) U.S. Cl. ...................................... 713/300; 713/320

(58) Field of Classification Search ................. 713/300, 713/320
See application file for complete search history.

(56) References Cited

U.S. PATENT DOCUMENTS

| | | | | | |
|---|---|---|---|---|---|
| 5,481,733 A | * | 1/1996 | Douglis et al. | ............. | 713/324 |
| 5,682,273 A | * | 10/1997 | Hetzler | ........................ | 360/75 |
| 6,310,848 B1 | * | 10/2001 | Ueki | ........................ | 369/53.37 |
| 6,330,069 B1 | * | 12/2001 | Kim | ........................... | 358/1.14 |
| 6,608,729 B1 | * | 8/2003 | Willems et al. | ................ | 360/69 |
| 6,654,895 B1 | * | 11/2003 | Henkhaus et al. | .......... | 713/320 |

FOREIGN PATENT DOCUMENTS

JP 9-17099 1/1997

\* cited by examiner

*Primary Examiner*—Lynne H. Browne
*Assistant Examiner*—Tse Chen
(74) *Attorney, Agent, or Firm*—Westerman, Hattori, Daniels & Adrian, LLP (57) ABSTRACT

An information processing apparatus having an information storage device, a power saving control method and a recording medium for storing the program therein, in which repetition of a periodic access pattern is recognized and the present mode is changed over to a power saving mode. In an information processing apparatus having an information storage device 1 such as a magnetic disc device, input/output data amount between a main unit of computer system 2 and the information storage device 1 is monitored by an input/output data amount monitoring unit 3, recorded in an input/output data amount history storage unit 5 at a sampling interval Y by an input/output data amount history management unit 4.

9 Claims, 12 Drawing Sheets

Fig. 1

Fig. 3A Input/Output Data Amount

Fig. 3B Input/Output Data Amount

Fig. 3C Input/Output Data Amount

Fig. 3D Input/Output Data Amount

|  | Time For Returning to Active | Power Consumption |
|---|---|---|
| Active | None | Large |
| Idle | Short | Smaller Than Active |
| Standby | Longer Than Idle | Smaller Than Idle |
| Sleep | Longer Than Standby | Smaller Than Standby |

METHOD, RECORDING MEDIUM AND APPARATUS FOR POWER SAVING CONTROL VIA DETECTION OF USAGE PATTERN BASED ON STORED HISTORY AND ACCOUNTING OF A SPIN DOWN COST

BACKGROUND OF THE INVENTION

1. Technical Field

The present invention relates to an information processing apparatus having an information storage device with a driving part such as a magnetic disc device, a power saving control method of monitoring an access state to the information storage device and shifting the present mode to a power saving mode, and a recording medium such as a magnetic disc or a semiconductor storage device in which a power saving control program is stored.

2. Description of Related Art

A large-capacity information storage device such as a magnetic disc device, a floppy disc device or a photomagnetic disc device employs a single or a plurality of discs as a recording medium and includes a driving part such as a motor that makes the disc rotate and a head positioning actuator that conducts the read/write of data with respect to the disc. The large-capacity information storage device is applied to external storage means of various information processing apparatuses. Also, the magnetic disc device is representatively classified into the IDE (Integrated Drive Electronics) type and the SCSI (Small Computer System Interface) type as an interface type. Further, in order to improve the efficiency of utilization of energy regarding an information processing apparatus, there has been proposed various power saving control means which change over the operating voltage, change over the operating clock frequency, or the like. In addition, the information storage device includes a power management function for reducing the power consumption by transition to the operating mode in accordance with the operating state of the main unit of computer system.

Figure 10:
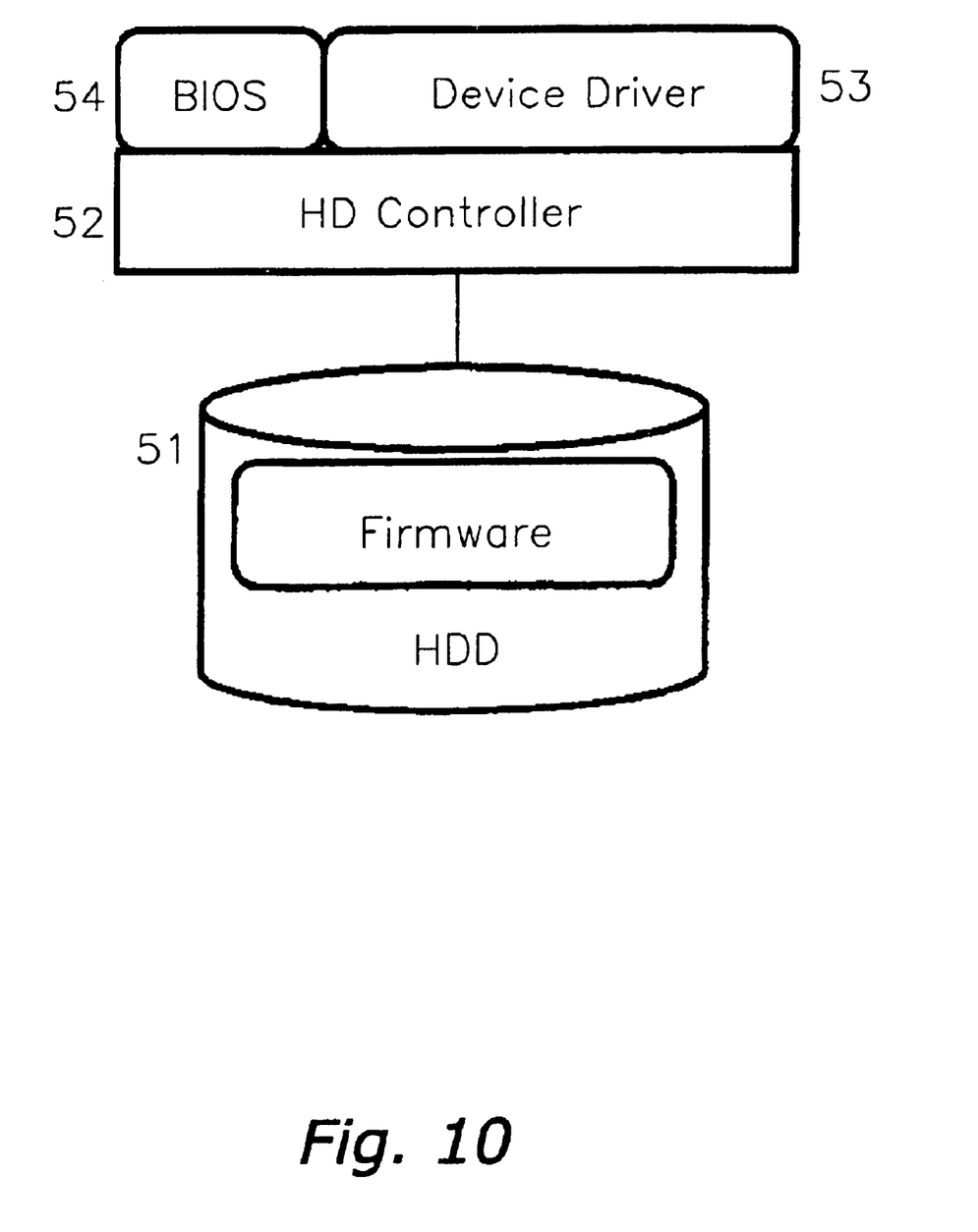
FIG. 10 is an explanatory diagram showing a conventional example.

For example, in a structure including an HD controller 52, a device driver 53, and a BIOS (Basic Input/Output System) 54 with respect to a firmware (including a magnetic disc device HDD) 51 shown in FIG. 10, the power management function of this type is realized mainly by the firmware 51, by the firmware 51 and the device driver 53, or by the combination of the firmware 51 with the BIOS 54.

Figure 11A:
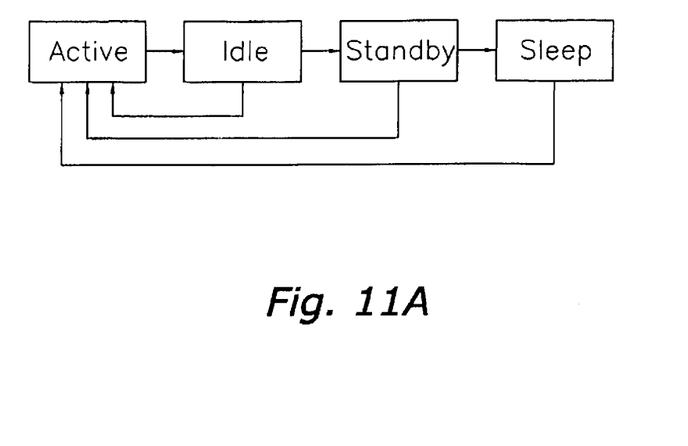
FIG. 11 is an explanatory diagrams showing the operating mode of an information storage device.

FIG. 11 is an explanatory diagram showing the operating mode of the information storage device, in which FIG. 11(A) shows a state transition and shows a case in which a mode is changed over such that the present mode is an active mode during a period where the read/write of the data is conducted in accordance with a request from the main unit of computer system with respect to the magnetic disc device HDD as the information storage device, the present mode is shifted to an idle mode if there is no access to the magnetic disc device HDD after a predetermined period of time elapses, the mode is then shifted to a standby mode if there is still no access for another predetermined period of time, and the mode is then shifted to a sleep mode if there is still no access after elapse of yet another predetermined period of time. Then, in the modes other than the active mode, the mode is shifted to the active mode in response to an access request from the computer body.

Figure 11B:
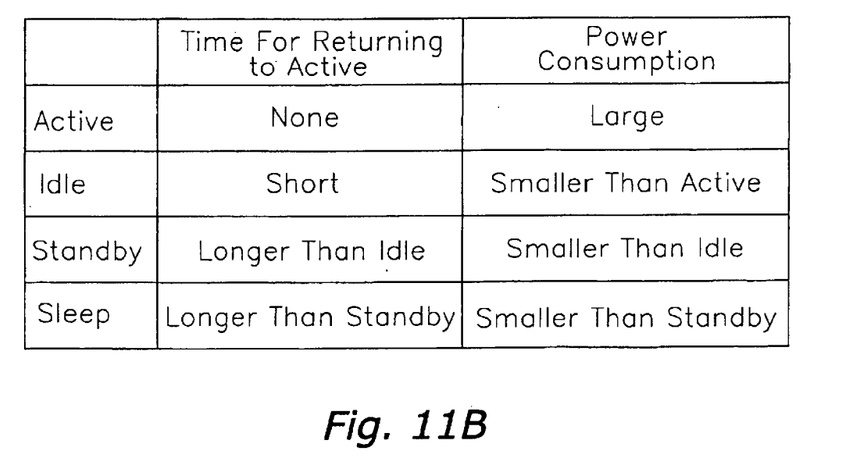

FIG. 11(B) shows a relationship between a period of time where the magnetic disc device HDD is returned to the active mode and the power consumption. The active mode is a state in which the motor is rotated as the driving part of the magnetic disc device HDD to conduct the read/write of data. The active mode is largest in power consumption of all the modes. Also, the idle mode is a state in which there is no access from the main unit of computer system to reduce the power consumption by conducting the power saving control. The idle mode is returned to the active mode in a short period of time in response to the access request from the main unit of computer system. Further, the standby mode is to conduct the power saving control so as to further reduce the power consumption, and a transition time period of from the standby mode to the active mode in response to the access request from the main unit of computer system is slightly long. Further, the sleep mode is to stop the motor of the magnetic disc device HHD so as to further reduce the power consumption, and a transition time period of from the sleep mode to the active mode in response to the access request from the main unit of computer system is longer since the sleep mode includes the initialization of the hardware and so on.

Figure 12A:
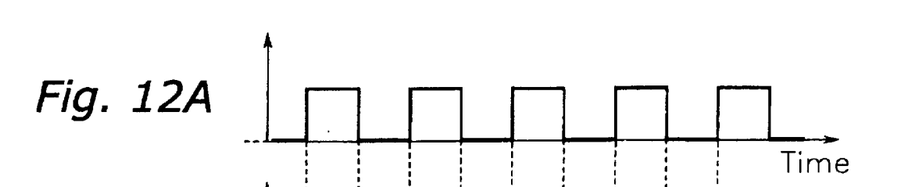
FIGS. 12A to D are explanatory diagrams showing a periodic access and a power saving control.
Figure 12B:
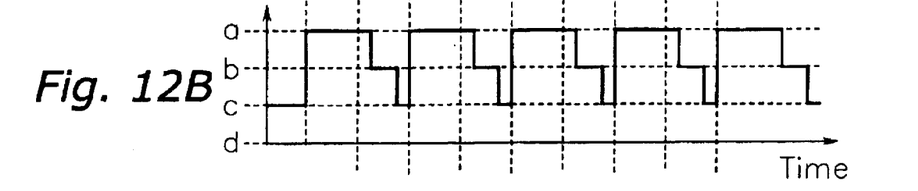

For example, as shown in FIG. 12(A), in the case where the magnetic disc device HDD is accessed periodically, the magnetic disc device HDD shifts from an active mode a to an idle mode b after a predetermined time period elapsed since the completion of access and shifts to a standby mode c after a further predetermined time period elapsed as shown in FIG. 12(B). If the magnetic disc device HDD is accessed during the standby mode c, the magnetic disc device HDD shifts from the standby mode c to the active mode a. In the case where the magnetic disc device HDD is not accessed further for a long time during the standby mode c, the magnetic disc device HDD shifts to a sleep mode d. The above power management control makes it possible to reduce the power consumption as compared with a case where the active mode continues.

Figure 12C:
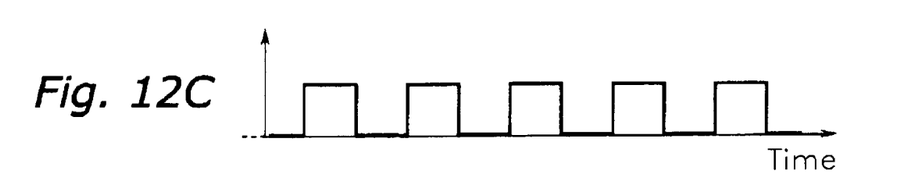
Figure 12D:
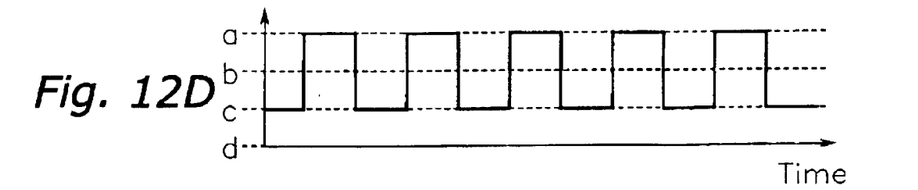

Also, FIG. 12(C) shows a periodic access state as in FIG. 12(A). In contrast to this, as shown in FIG. 12(D), it is considered that a shortened period of time of the idle mode b where the magnetic disc device HDD is shifted from the active mode a to the standby mode c reduces the power consumption further. However, there has not yet been known how to realize such a power saving mode.

As described above, in the case where access is periodically made to the information storage device from the main unit of computer system, if the period is found out, it is unnecessary to continue the active mode and the idle mode for a constant period of time during the time period where there is no access. As shown in FIG. 12(D), after the access has been completed, the magnetic disc device HDD is set to a power saving mode where the period of the idle mode b is shortened and then shifted to the standby mode, thereby the power consumption can be further reduced.

However, the power management function of the magnetic disc device HDD is mainly realized by the firmware 51, and in order to conduct the power management control as the one described above, it is necessary to correct the firmware 51. In this case, since there is restriction in code size of the firmware 51, only a slight function can be added. Also, since there is no margin of the code size, it is generally difficult to correct the code. Further, even if the firmware 51 can be corrected, it is necessary to correct the firmware 51 so as to be adaptive to the magnetic disc device HDD, and there arises a problem that an erroneous correction may occur in this point.

Also, there has been known a method in which an access frequency is obtained as the pattern of access to the magnetic disc device HDD, and a power supplied to structural elements is reduced when the access frequency is equal to or less than a threshold value (See Japanese Patent Application Laid-Open No. Hei 9-17099, for example). However, the access frequency to the magnetic disc device HDD fluctuates during a process of executing various programs in the main unit of computer system. Also, the access frequency is shown in the form of temporal average in the case of access having an ideal periodicity as shown in FIGS. 12(A) and 12(C), and therefore stable power saving control is difficult.

SUMMARY OF THE INVENTION

An object of the present invention is to stably and surely execute power saving control by obtaining a repeat period of access to an information storage device and judging the presence/absence of an input/output data amount to the information storage device when the period is obtained, thereby conducting the change-over between a normal mode and a power saving mode.

An information processing apparatus according to the present invention will be described with reference to FIG. 1. The information processing apparatus of the present invention is an information processing apparatus having an information storage device 1 such as a magnetic disc device or a photomagnetic disc device, and monitors an input/output data amount between a main unit of computer system 2 and the information storage device 1 by an input/output data amount monitoring means 3. The information processing apparatus includes an input/output data amount history storage means 5 for retaining the history of the input/output data amount by an input/output data amount history management means 4, and a power management control means 6. The power management control means 6 finds a period X in which a variation of the input/output data amount repeats a given pattern with reference to the history of the input/output data amount retained in the input/output data amount history storage means 5. When the period X is obtained, the power management control means 6 judges whether the input/output data amount is zero, or not, in a period of from a time (C−X) till a time (C−X+Z) obtained from the present time C, the period X and a spin down cost Z. If the input/output data amount is zero, the power management control means 6 changes over the present mode of the information storage device 1 from the normal mode, for example, a mode shown in FIG. 12(B), to the power saving mode, for example, a mode shown in FIG. 12(D).

In a second aspect of the present invention, the power management control means 6 also obtains an active ratio indicative of a ratio of access to the information storage device 1 with respect to the operating period of time of the main unit of computer system 2 and judges that the variation in the input/output data amount repeats a given pattern if the active ratio is within a given range and changes over from the present mode to the power saving mode.

A third aspect of the present invention provides the information processing apparatus as set fourth in the first aspect of the present invention, wherein the input/output data amount is retained for a period twice longer than the period X in which the variation in the input/output data amount repeats the given pattern.

A fourth aspect of the present invention provides the information processing apparatus as set fourth in any one of the first to third aspects, wherein the input/output data amount is stored in the input/output data amount history storage means at the sampling intervals of ½ or less of the spin down cost.

A fifth aspect of the present invention provides a power saving control method, comprising the steps of: retaining the history of the input/output data amount between a main unit of computer system and an information storage device in an input/output data amount history storage means; obtaining a period X in which a variation in the input/output data amount repeats a given pattern on the basis of the history of the input/output data amount retained in the input/output data amount history storage means by power management control means with respect to the information storage device; judging whether or not the input/output data amount is zero during a period from a time (C−X) till a time (C−X+Z) obtained from the period X, the present time C and a spin down cost Z, with reference to the input/output data amount history storage means; and changing over from the present mode of the information storage device to a power saving mode when the input/output data amount is zero.

A sixth aspect of the present invention provides the power saving control method as set forth in the fifth aspect, comprising the steps of: obtaining an active ratio indicative of a ratio of access to the information storage device with respect to the operating period of time of a main unit of computer system; judging whether the active ratio is within a given range determined by application software adaptation, or not; judging that the variation of the input/output data amount repeats the given pattern if the active ratio is within the given range; and changing over from the present mode of the information storage device to the power saving mode.

A seventh aspect of the present invention provides the power saving control method as set forth in the fifth or sixth aspect, wherein the sampling interval Y at which the input/output data amount is stored in the input/output data amount history recording means is set to ½ or less of the spin down cost Z.

An eighth aspect of the present invention provides a power saving control method and a recording medium for storing a power saving control program according to the present invention which include the steps of: retaining the history of the input/output data amount between a main unit of computer system 2 and an information storage device in an input/output data amount history storage means 5; obtaining a period X in which a variation in the input/output data amount repeats a given pattern on the basis of the history of the input/output data amount retained in the input/output data amount history storage means 5 by a power management control means 6 with respect to the information storage device 1; judging whether or not the input/output data amount is zero during a period from a time (C−X) till a time (C−X+Z) obtained from the period X, the present time C and a spin down cost Z, with reference to the input/output data amount history storage means; and changing over from the present mode of the information storage device 1 to a power saving mode when the input/output data amount is zero.

A ninth aspect of the present invention provides the power saving control method and the recording medium for storing the power saving control program which may include the steps of: obtaining an active ratio indicative of a ratio of access to the information storage device with respect to the operating period of time of the main unit of computer system 2; judging whether the active ratio is within a given range determined by application software adaptation, or not; and judging that the variation of the input/output data amount repeats the given pattern if the active ratio is within the given range.

From the following detailed description in conjunction with the accompanying drawings, the foregoing and other

DETAILED DESCRIPTION OF THE PREFERRED EMBODIMENTS

Figure 1:
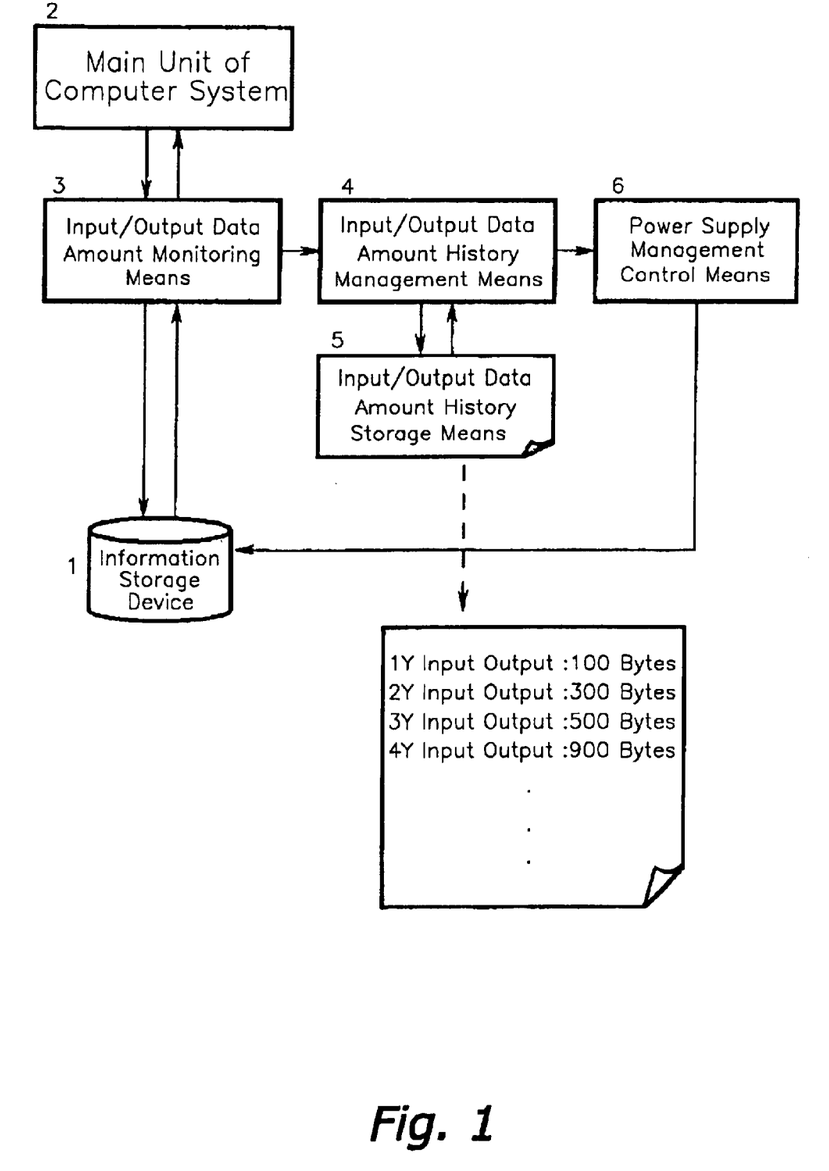
FIG. 1 is an explanatory diagram of an embodiment of the present invention.

FIG. 1 is an explanatory diagram showing an embodiment of the present invention, and in the figure, reference numeral 1 denotes an information storage device having a driving part such as a magnetic disc device, 2 is a main unit of computer system, 3 is an input/output data amount monitoring means, 4 is an input/output amount history management means, 5 is an input/output data amount history storage means and 6 is a power management control means.

The input/output data amount monitoring means 3 is adapted to monitor the input/output data amount transferred between the main unit of computer system 2 and the information storage device 1, and employs any one of the input data amount and the output data amount or a sum of both those amounts for monitoring the input/output data amount. Also, the input/output data amount history management means 4 receives the input/output data amount information from the input/output data amount monitoring means 3 at each predetermined set sampling interval Y and records the input/output data amount information in the input/output data amount history storage means 5. The input/output data amount history storage means 5 can be made up of a semiconductor memory or the like and also can be referred to from the power management control means 6. Then, the input/output data amount is recorded, for example, as 1Y input/output 100 bytes, 2Y input/output 300 bytes, . . . , at each of the sampling intervals Y as indicated below. The recording period is set to be, for example, a period twice longer than the period X which will be described later.

Also, the power management control means 6 finds the period X in the case where the information storage device 1 is periodically accessed from the main unit of computer system 2. In obtaining the period X, assuming that the present time is C, an elapse time since the input/output data amount history management means 4 starts to record the input/output data amount history till the present time is P, an arbitrary time is T, and the input/output data amount at a time t is A(t), T is changed from 0 to P/2, the following expression is obtained.

$$M(T)=\Sigma^{T/Y}_{i=0} \{A(C-T+iY)-A(C-2T+iY)\}^2 \quad (1)$$

In the expression (1), $\Sigma^{T/Y}_{i=0}$ indicates that values resulting from squaring a difference of the values surrounded by the parentheses are accumulated in case of i=0 to i=T/Y, and a value of M(T) when M(T) is equal to or less than a threshold value is set to the period X.

Figure 2A:
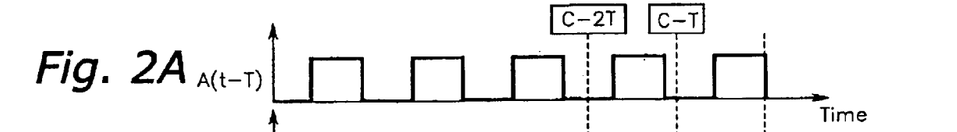
FIGS. 2A to D are explanatory diagrams showing the calculation of a period X.
Figure 2B:
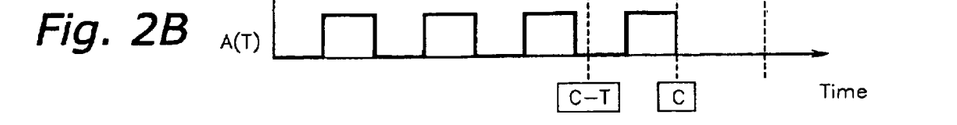

FIG. 2 is an explanatory diagram showing the calculation of the above-described period X, and the periodic input/output data amount is indicated as the same value for simplification, and FIG. 2(A) indicates the input/output data amount history of a time (C–T) which is from the present time C till an arbitrary time T whereas FIG. 2(B) indicates the input/output data amount history till the present time C. In this case, a difference between the input/output data amount A(t) at the present time C and the input/output data amount A(t–T) at the time (C–T) from the present time C till the time T becomes large. In this case, if M(T) in the expression (1) is obtained by sequentially changing the time T, M(T) exceeds predetermined threshold value. This indicates that the periodicity of the pattern of the variation in the input/output data amount is small.

Figure 2C:
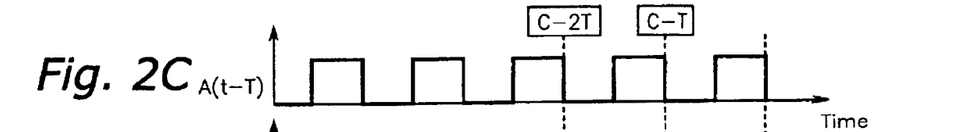
Figure 2D:
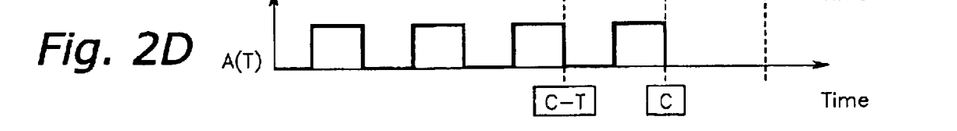

In contrast to this, in the case shown in FIGS. 2(C) and 2(D), in the input/output data amount history of the time (C–T) of from the present time C till the arbitrary time T, a difference between the input/output data amount A(t) at the present time C and the input/output data amount A(t–T) at the time (C–T) of from the present time C till the time T becomes small. Therefore, M(T) in the expression (1) becomes equal to or less than the predetermined threshold value. In this way, the case where M(T) becomes equal to or less than the threshold value indicates that the periodicity of the pattern of a variation in the input/output data amount at the time T is large. Thus, it is assumed that M(T) is the repeat period X of the variation in the input/output data amount. Since M(T) is obtained by sequentially changing the arbitrary time T, in the case where M(T) is the minimum value, M(T) can be regarded as the period X.

After the period X has been obtained, in the case where the input/output data amount is zero, that is, there is no access between a time (C–X) the period X before the present time C and the time (C–X+Z), it can be estimated that there is also no access between a period between the present time C and the time (C+Z). In the case where it can be thus estimated that there is no access during a future period of C+Z, the power management control means 6 (refer to FIG. 1) sends to the information storage device 1 to a power management control command for shifting the operating mode of the information storage device 1 from a mode at that time, for example, the normal mode to the power saving mode. If the mode at that time is the power saving mode, the power saving mode is continued.

The above-described Z is a value inherent to the information storage device 1, and the power consumption necessary for the information storage device 1 to return from the power saving mode to the normal mode is determined in accordance with the kind of the information storage device 1 or the like. Z represents a period of time during which the information storage device operates in the normal mode by using the power consumption equal to the power consumption necessary for returning from the power saving mode to the normal mode. In general, Z is called "spin down cost (operating mode transition cost)". Also, it is desirable that the sampling interval Y is set to ½ or less of the spin down cost Z.

When a period of time during which there is no access does not exceed the spin down cost Z, that is, at the time of no access in a short period of time, if the information storage device is shifted to the power saving mode, the transition to the active mode is repeated as soon as the mode is shifted to, for example, the standby mode, and as a result, the power consumption cannot be reduced, and the power consumption is rather increased. Therefore, it is desirable that the information storage device is shifted to the power saving mode only when the period of time during which there is no access exceeds the spin down cost Z.

FIG. 3 is an explanatory diagram showing an access pattern. When the period X is obtained through the above-described expression (1), in case of the pattern of the input/output data amount indicated by FIG. 3(A), the presence/absence of access between the time (C−X) the period X before the present time C and the subsequent time (C−X+Z) (Z=spin down cost), that is, whether the input/output data amount is zero or not is judged with reference to the contents stored in the input/output data amount history storage means 5. In case of FIG. 3(A), since the input/output data amount is not zero during the period of the spin down cost Z, it is judged that it is difficult to estimate the presence/absence of access during the subsequent period. In this case, the present mode is not shifted to the power saving mode shown in FIG. 12(D), but the power management control is conducted on the information storage device 1 in the normal mode, for example, a mode shown in FIG. 12(B).

Figure 3A:
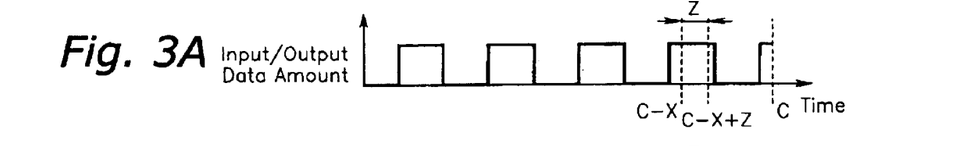
FIGS. 3A to D are explanatory diagrams showing an access pattern.
Figure 3B:
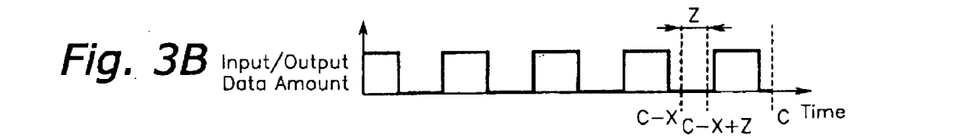

In contrast to this, in the case of the pattern of the input/output data amount shown in FIG. 3(B), during the period between the time (C−X) the period X before the present time C and the subsequent time (C−X+Z), since the input/output data amount is zero, it is estimated that the subsequent pattern becomes also the same access pattern, and the present mode is shifted to the power saving mode shown in FIG. 12(D). That is, upon the completion of the next access such as read/write or the like, the power saving control is conducted where the active mode is shifted to the standby mode directly or through the idle mode which is extremely short in period of time.

Figure 3C:
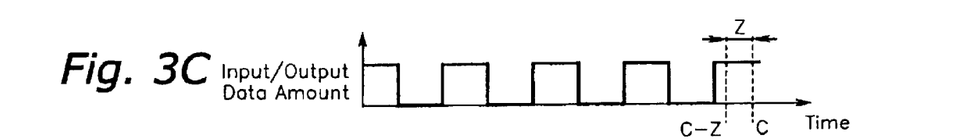
Figure 3D:
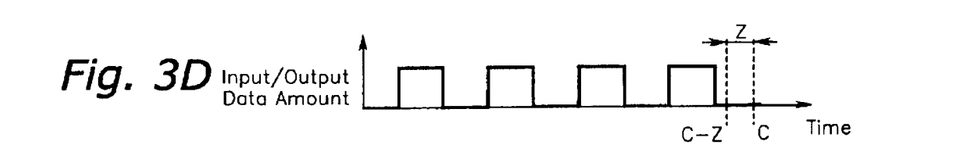

Also, FIG. 3(C) shows a case in which the input/output data amount during the period between the times C and (C−Z) is not zero, and FIG. 3(D) shows a case in which the input/output data amount during the period between the times C and (C−Z) is zero. When the repeat period X of the same pattern is obtained on the basis of the above input/output data amount history and the period X is obtained, the presence/absence of the input/output data amount during the period of the spin down cost Z is judged, and if the input/output data amount is zero, it is judged that the subsequent period becomes the repeat of the same pattern, and the present mode is changed over to the power saving mode, thereby being capable of changing over from the normal mode taking the spin down cost Z into consideration to the power saving mode.

Also, there is a case in which it is difficult to determine the period X by only M(T) in the above-described expression (1). In this case, it is assumed that the active ratio Act indicative of the ratio of access to the information storage device 1 to the operating time of the main unit of computer system 2 is a second index. For example, only when a specific application program is being executed, there are many cases in which the access pattern according to that application program is repeated. Therefore, in order to judge whether the same access pattern caused by executing the specific application program is repeated or not, the active ratio Act is found.

That is, using the present time C, the arbitrary time T, the sampling interval Y, the input/output data amount $A_2(t)$ and the period X, the following expression is obtained.

$$Act = \{\Sigma^{X/Y}_{i=0} A_2(C-T+iY)\}/(X/Y) \qquad (2)$$

In the expression (2), $\rho^{X/Y}_{i=0}$ indicates the accumulation of $A_2(C-T+iY)$ between $i=0$ and $i=X/Y$. Also, it is assumed that $A_2(t)$ is 0 if $A(t)=0$ and 1 if $A(t)>0$. Further, the period X corresponds to the arbitrary time T in the expression (1) and conducts the accumulation surrounded by the parentheses while sequentially changing the arbitrary time T.

The active ratio Act is obtained from the expression (2), and it is judged whether the same access pattern is repeated by the execution of the specific application software or not. In other words, there are many cases in which the same access pattern is repeated by the execution of the specific application software, and therefore if the active ratio Act is a predetermined judgement adaptive to the application software, it can be judged that the same access pattern is repeated. From the judgement result, the above-described period X is obtained, and the power management control means 6 (refer to FIG. 1) changes over the information storage device 1 from the normal mode to the power saving mode as in the case where the input/output data amount during the period of the spin down cost Z is zero.

The active ratio Act has the following three applications.

(a) The specific software operates at the active ratio smaller than the upper-limit active ratio (Act<ActMax).

(b) The specific software operates at the active ratio larger than the lower-limit active ratio but smaller than the upper-limit active ratio (ActMin<Act<ActMax).

(c) The active ratio is ignored, and it is not judged whether the specific software is executed or not.

The selection of the above applications can be made in accordance with the kind of the application software or the like.

Figure 4:
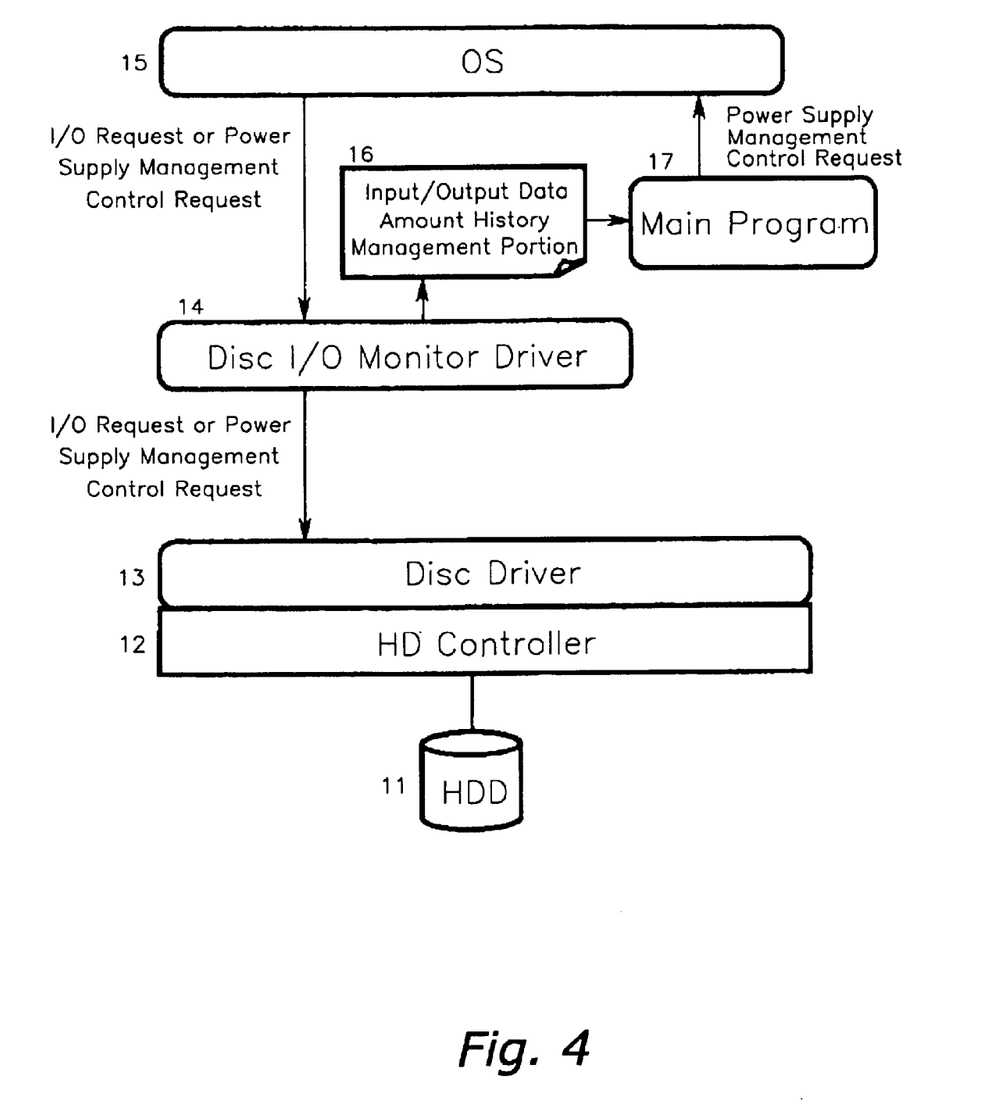
FIG. 4 is an explanatory diagram showing a power management function in accordance with an embodiment of the present invention.

FIG. 4 is an explanatory diagram showing the power management function in accordance with an embodiment of the present invention. In the figure, reference numeral 11 denotes a magnetic disc device (HDD) as the information storage device, 12 is an HD controller, 13 is a disc driver, 14 is a disc I/O monitor driver, 15 is an operating system (OS), 16 is an input/output data amount history management part, and 17 is a main program. The input/output data amount history management part 16 has the functions of the input/output data amount history management means 4 and the input/output data amount history storage means 5 shown in FIG. 1. Hereinafter, a changeover procedure between the normal mode and the power saving mode will be described.

The input/output data amount from an OS 15 corresponding to the main unit of computer system 2 shown in FIG. 1 to the disc driver 13 is monitored by a disc I/O monitor driver 14, and the history of the input/output disc amount at each of the sampling intervals Y is recorded by the input/output data amount history management part 16. In FIG. 1, the input/output data amount is monitored by the input/output data amount monitoring means 3, and the input/output data amount at each of the sampling intervals Y is recorded in the input/output data amount history storage means 5 by the input/output data amount history management means 4.

In this case, the sampling interval Y can be set to ½ or less of the spin down cost Z. Then, in the case where an elapse time P until the present time since the input/output data amount history starts to be recorded does not exceed $2X_0$ ($X_0$ is ½ of a time that starts to determine the period X and indicative of the initial value of the period which is provisionally determined), the main program 17 refers to the contents of the input/output data amount history at each of the sampling intervals Y and issues a power management control request to the OS 15 in the case where the input/output data amount recorded during the period of from the time (C−Z) to the present time C is zero.

The OS 15 issues the power management control request to the disc driver 13. The disc driver 13 shifts the operating mode of the magnetic disc device 11 from the idle mode to the standby mode. This process is repeated at each of the sampling intervals Y until the elapse time P exceeds $2X_0$.

Also, the active ratio Act is obtained by using the expression (2), and it is judged whether the same access pattern resulting from the execution of the specific application software is repeated or not, and in the case where a specific application software in which the same access pattern is repeated is executed, the power saving mode continues. If the software is not executed, the present mode is shifted to the normal mode. The active ratio Act is not kept constant but becomes a value in a range corresponding to the software. Therefore, it can be judged whether the specific application software is executed or not, with the active ratio Act as an index.

M(T) is obtained by the main program 17 in accordance with the expression (1), and if M(T) which is equal to or less than the threshold value is obtained, it is judged that the periodic access pattern is repeated, and it is assumed that M(T) is the period X. If the period X cannot be determined, and if it is judged that the above-mentioned specific application software is not executed, the present mode is shifted to the normal mode.

Also, M(T) is obtained when T=X by using the expression (1). In the case where M(T) exceeds the threshold value, the present mode is shifted to the normal mode. Also, the main program 17 refers to the input/output data amount history from the input/output data amount history management part 16 and issues the power management control request to the OS 15 in the case where the input/output data amount recorded during the period of from the time (C−X) to the time (C−X+Z) is zero. The OS 15 issues the power management control request to the disc driver 13, and the disc driver 13 shifts the operating mode of the magnetic disc device 11 to the power saving mode. Since the general device driver has a margin to the code size more than the firmware, it is easy to install a power saving control algorithm, and the device driver is rich in flexibility. Also, in the case where it is necessary to update the device driver, since no update software different between the respective devices which is required to update the firmware is required, update can be made by using the update software common to OS. Therefore, even in an existing information processing apparatus, the power saving control program is stored in a semiconductor memory such as an IC card or in a recording medium of the magnetic disc and then installed, thereby being capable of conducting the power saving control high in efficiency.

Figure 5:
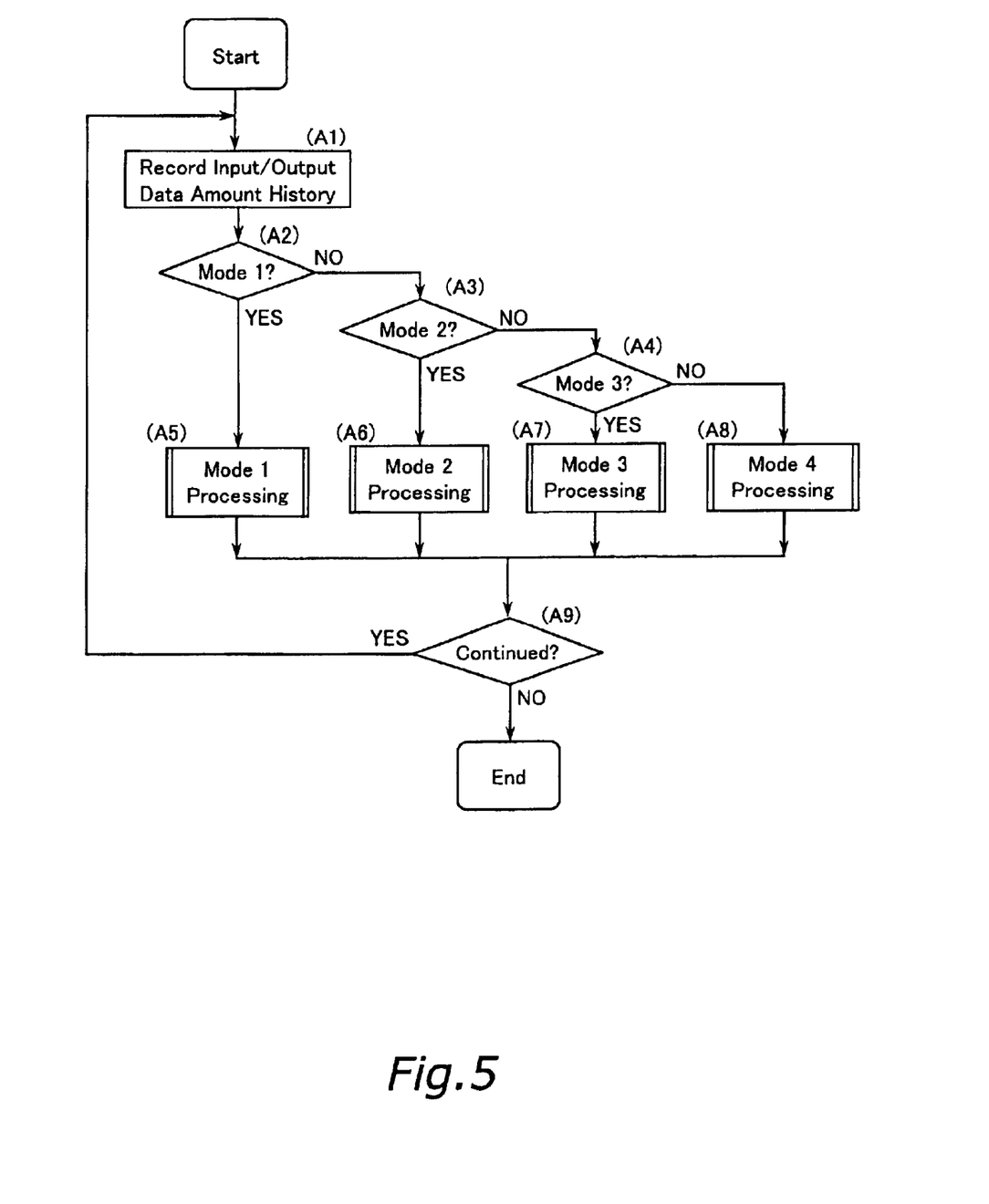
FIG. 5 is a flowchart showing the embodiment of the present invention.

FIG. 5 is a flow chart in accordance with an embodiment of the present invention, in which the input/output data amount history is recorded (A1), it is judged whether it is a mode 1 or not (A2), and if it is not the mode 1, it is judged whether it is a mode 2 or not (A3), and if it is not the mode 2, it is judged whether it is a mode 3 or not (A4). In other words, the input/output data amount between the main unit of computer system 2 and the information storage device 1 is recorded in the input/output data amount history recording means 5 by the input/output data amount history management means 4 through the input/output data amount monitoring means 3 shown in FIG. 1, and the operating mode is judged by the power management control means 6. For example, the mode 1 is representative of the active mode, the mode 2 is representative of the idle mode, the mode 3 is representative of the standby mode and the mode 4 is representative of the power saving mode according to the embodiment of the present invention. The processing of the mode 1 (A5), the processing of the mode 2 (A6), the processing of the mode 3 (A7) and the processing of the mode 4 (A8) which correspond to the respective judgement results are conducted, and it is judged whether the respective modes 1 to 4 are continued or not (A9). If they are not continued, the operation is terminated whereas if they are continued, the operation is shifted to the step (A1).

Figure 6:
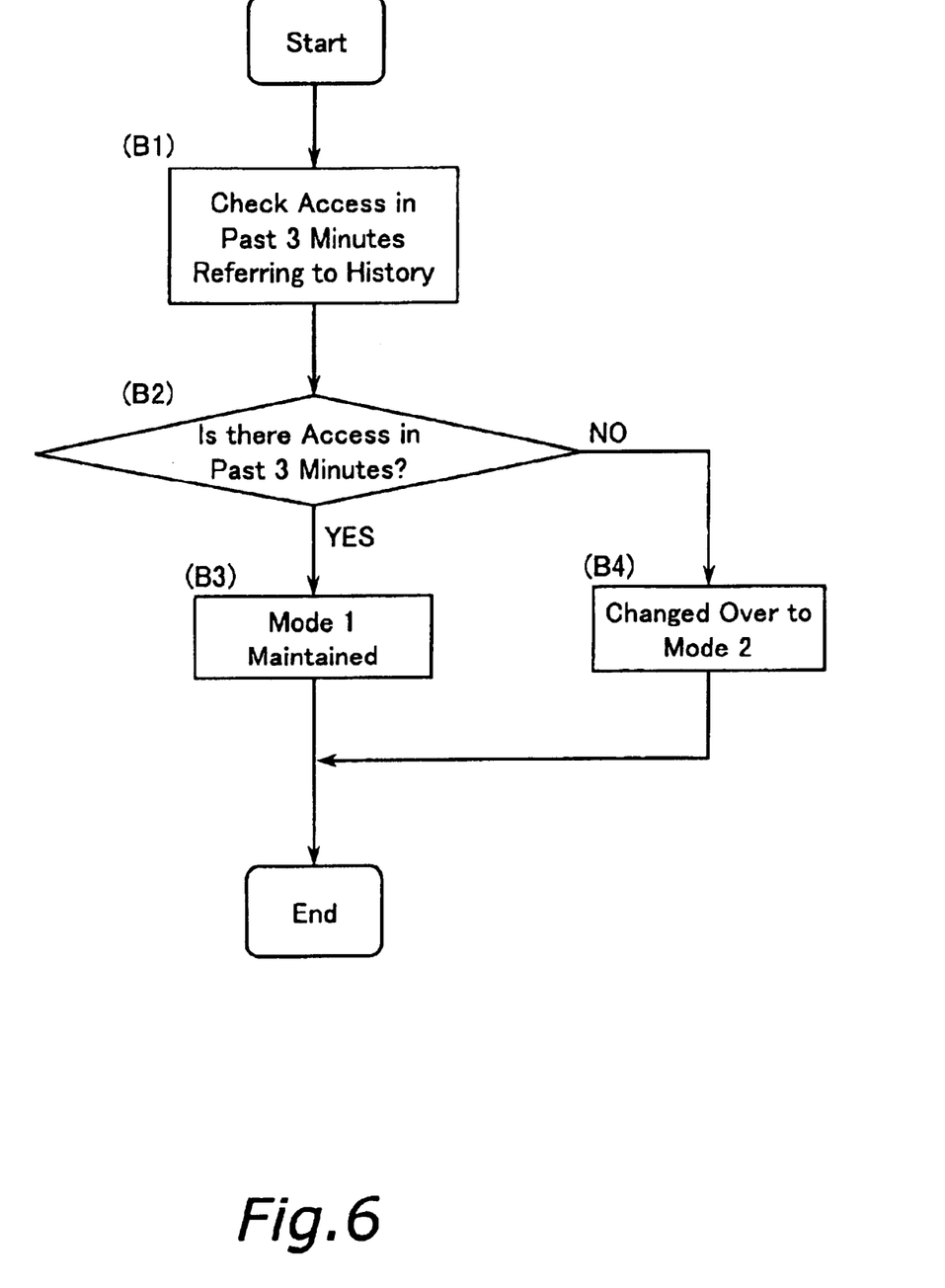
FIG. 6 is a flowchart showing the processing of a mode 1.

FIG. 6 shows a flowchart of the processing of the mode 1 in which access for the past three minutes is recognized referring to the input/output data amount history (B1). Then, the presence/absence of the access for the past three minutes is judged (B2). Three minutes as the judgement period of time in this case can be set to another arbitrary period of time or may be set to less than three minutes. Also, if it is judged that there is an access, the mode 1 is maintained (B3), whereas it is judged that there is no access, the present mode is changed over to the mode 2 (B4).

Figure 7:
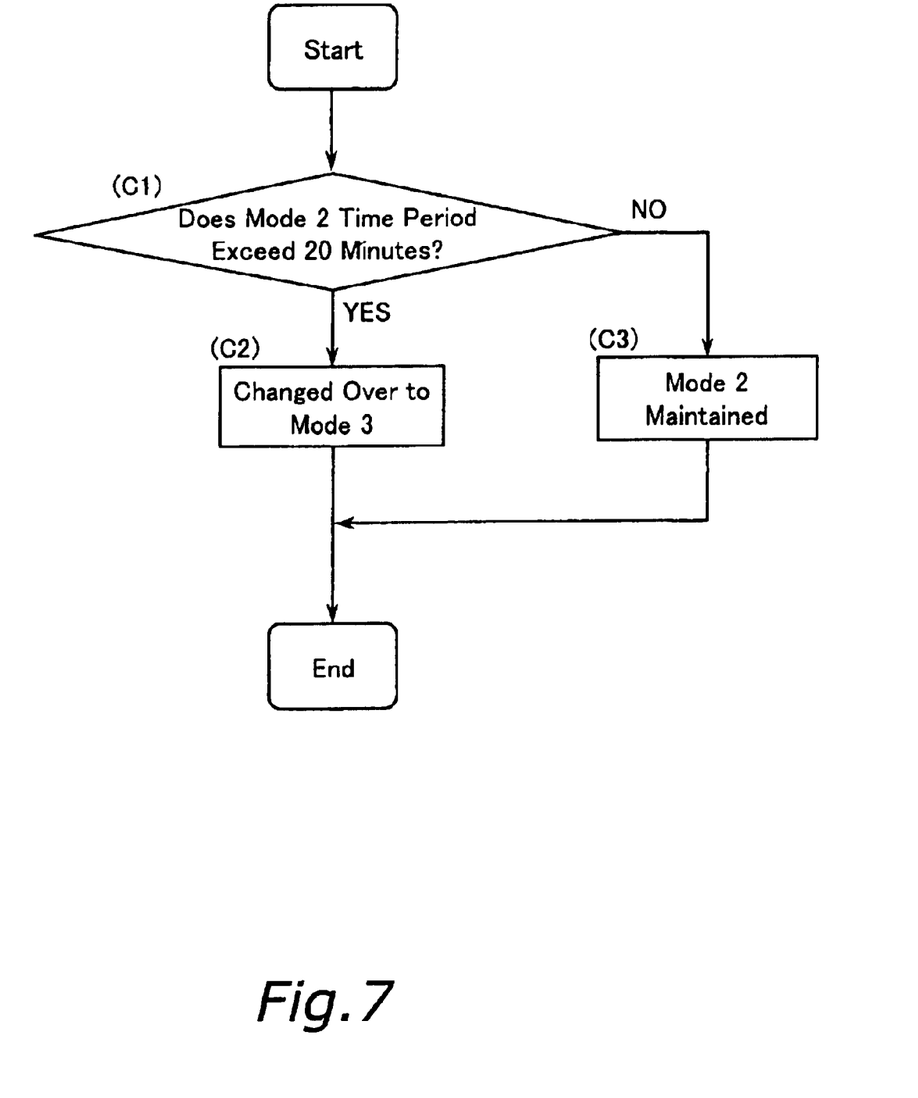
FIG. 7 is a flowchart showing the processing of a mode 2.

FIG. 7 shows a flowchart of the processing of the mode 2 in which it is judged whether a period of time of the mode 2 exceeds 20 minutes or not (C1), and if the period of time exceeds 20 minutes, the present mode is changed over to the mode 3 (C2), but if the period of time does not exceed 20 minutes, the mode 2 is maintained (C3). 20 minutes as the judgement period of time in this case can be set to another arbitrary period of time or may be set to 20 minutes or less.

Figure 8:
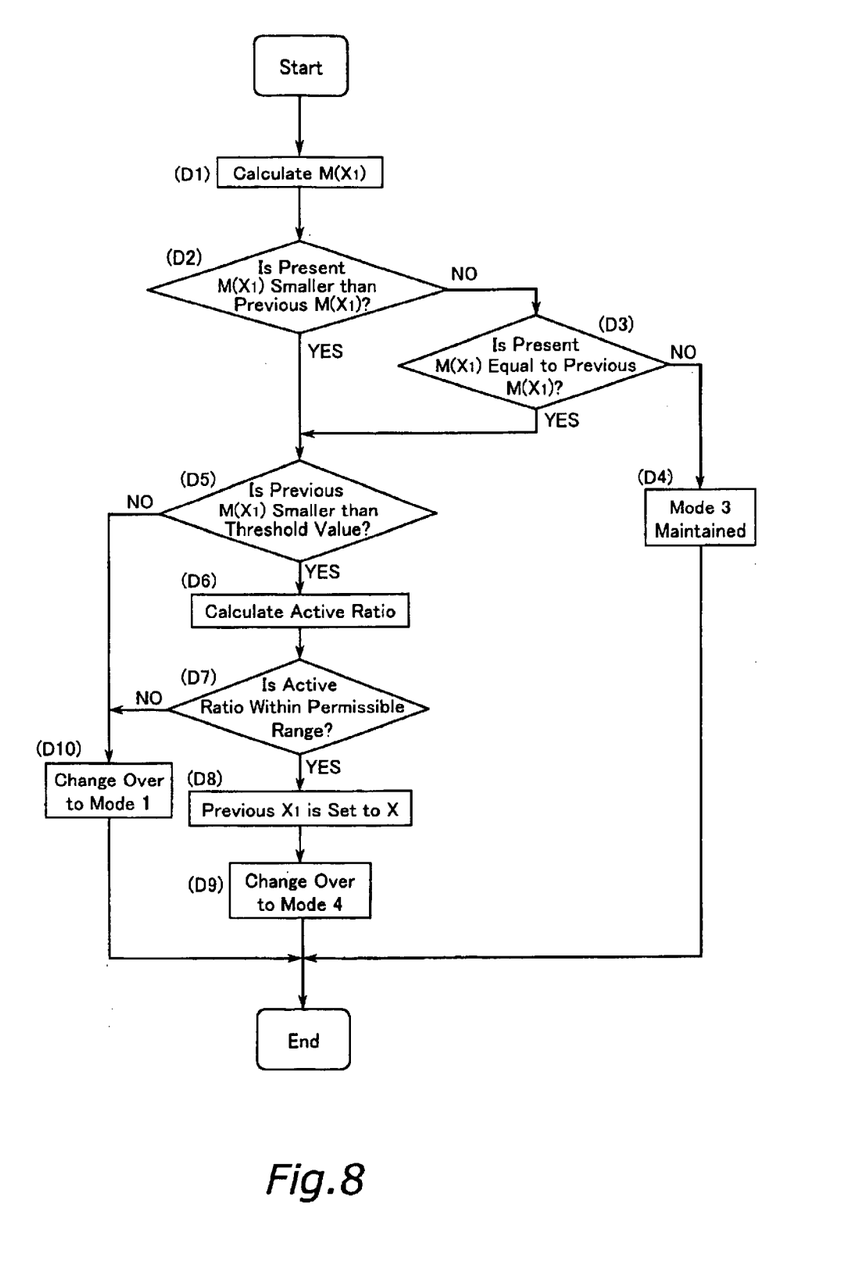
FIG. 8 is a flowchart showing the processing of a mode 3.

FIG. 8 shows a flowchart of the processing of the mode 3, in which M (X1) corresponding to the above-mentioned M(T) is calculated (D1), and it is judged whether M(X1) obtained at this time is smaller than the previously obtained M(X1) or not (D2). If larger, it is judged whether the previous M(X1) and the present M(X1) are equal to each other or not (D3), and if not equal, the mode 3 is maintained (D4).

Also, if the present M(X1) is smaller than the previous M(X1), and the previous M(X1) is equal to the present M(X1), it is judged whether the previous M(X1) is smaller than a threshold value or not (D5), and if the previous M(X1) is smaller than the threshold value, the active ratio Act is calculated (D6). It is judged whether the active ratio Act is within a permissible range or not (D7). If it is within the permissible range, the previous X1 is set to the period X (D8), and the present mode is changed over to the mode 4 (D9). In other words, the modes 1 to 3 are changed over to the power saving mode.

The above shows a case in which because the period X and the active ratio Act are within the permissible range, it is estimated that the access to the information storage device repeats the same pattern, and the present mode is shifted to the power saving mode where the idle mode is reduced or omitted. Taking the spin down cost Z which will be described later into consideration, control may be conducted so that the present mode may be shifted to the power saving mode. Also, if the previous M(X1) is not smaller than the threshold value and the active ratio Act is not within the permissible range, the pattern of the variation in the input/output data amount has no periodicity, and since the subsequent access cannot be estimated, the present mode is changed over to the mode 1 (D10).

Figure 9:
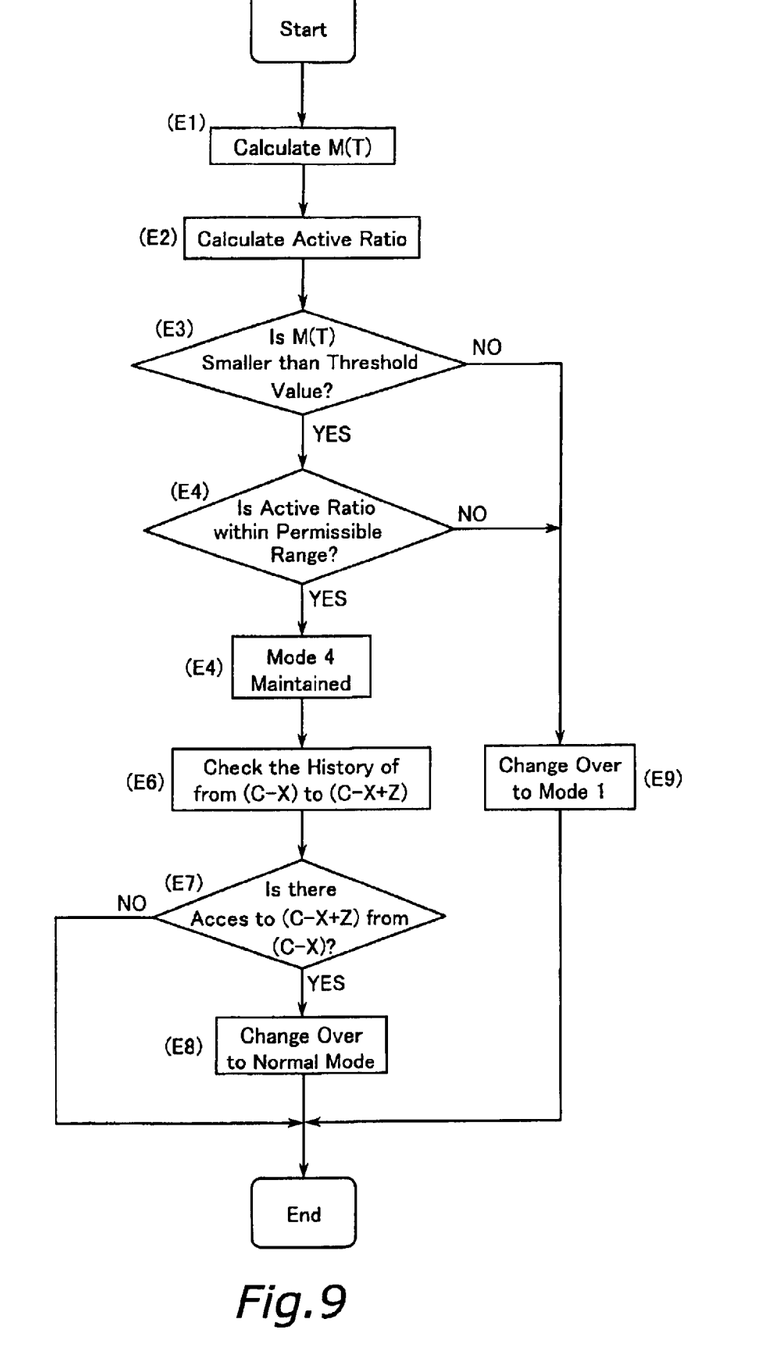
FIG. 9 is a flowchart showing the processing of a mode 4.

FIG. 9 shows a flowchart of the processing of the mode 4. The processing includes a step of retaining the history of the input/output data amount between the main unit of computer system 2 and the information storage device 1 in the input/output data amount history storage means 5, a step (E1) of calculating M(T) in accordance with the above-mentioned expression (1) on the basis of the input/output data amount history, and a step (E2) of obtaining the active ratio Act in accordance with the above-mentioned expression (2).

Then, it is judged whether M(T) is smaller than the threshold value or not (E3), and if smaller, the period X is determined as described above, and further, it is judged whether the active ratio Act is within the permissible range or not (E4), and if the active ratio Act is within the permissible range, since it is estimated that the pattern of the variation in the input/output data amount is repeated in the period X, the mode 4, that is, the power saving mode, is maintained (E5), and the history of the input data amount between the time (C−X) and the time (C−X+Z) obtained from the present time C, the period X and the spin down cost Z is recognized (E6), and it is judged whether there is an access during the period between the time (C−X) and the time (C−X+Z) or not, that is, the presence/absence of the input/output data amount (E7), and if no access, the mode 4 is continued. If there is an access, the present mode is changed over to the normal mode (E8). If M(T) by the expression (1) is not smaller than the threshold value, or if the active ratio Act is not within the permissible range, the present mode is changed over to the mode 1 (E9).

The present invention is not limited to only the above-mentioned respective embodiments, but various additional alternations may be made. The information storage device 1 may be formed of not only magnetic disc device but also various storage devices having the driving part such as a motor. Also, the normal mode includes, for example, a mode for conducting the power management control as shown in FIG. 12(B), and the recording medium in which the power saving control program is stored may be various recording medium such as a floppy disc, a magnetic disc, a photo-magnetic disc, an optical disc or a semiconductor memory.

As was described above, according to the present invention, the period X in which the same pattern of the variation in the input/output data amount is repeated is obtained on the basis of the history of the input/output data amount to the information storage device 1, and in the case where the input/output data amount becomes zero during the period from the time (C−X) to the time (C−X+Z) resulting from the period X, the present time C and the spin down cost Z, it is estimated that the change pattern of the succeeding input/output data amount is continuously repeated, and the present mode is changed over to the power saving mode as shown in FIG. 12D, which is advantageous in that the power consumption can be stably reduced.

Also, in general, since the device driver has a margin to the code size as compared with the firmware of the information storage device such as the magnetic disc device HDD, the device driver 13 is provided with the main function as the embodiment of realizing the power management control function, and the low-level power management control can be conducted on the firmware of the information storage device such as the magnetic disc device (HDD), thereby making it easy to provide the more-rigid power saving control function.

Also, by obtaining an active ratio Act indicative of a ratio of access to the information storage device 1 such as a magnetic disc device with respect to the operating period of time of a main unit of computer system 2 (refer to FIG. 1) and judging whether or not the active ratio ACT is within a given range determined by application software adaptation, it is recognized that the same access pattern is repeated, and in this case, the present mode is shifted to the power saving mode, thereby the power consumption can be reduced.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An information processing apparatus having an information storage device, comprising:

input/output data amount history storage means for retaining the history of an input/output data amount with respect to said information storage device; and power management control means for obtaining a period X, which is greater than zero, in which a variation in the input/output data amount repeats a given pattern with reference to the history of the input/output data amount retained in said input/output data amount history storage means, and for judging whether the input/output data amount is zero during a period from a time (C−X) till a time (C−X+Z) obtained from the period X, the present time C and a spin down cost Z to change over from the present mode of said information storage device to a power saving mode when the input/output data amount is zero.

2. The information processing apparatus according to claim 1, wherein:

said power management control means obtains an active ratio indicative of a ratio of access to said information storage device with respect to the operating period of time of a main unit of computer system, judges whether or not the active ratio is within a given range determined by application software adaptation, judges that the variation of the input/output data amount repeats the given pattern if the active ratio is within the given range, and changes over from the present mode of said information storage device to the power saving mode.

3. The information processing apparatus according to claim 1, wherein:

the input/output data amount is retained for a period twice longer than the period X in which the variation in the input/output data amount repeats the given pattern.

4. The information processing apparatus according to claim 1, wherein:

the input/output data amount is stored in said input/output data amount history storage means at the sampling intervals of ½ or less of the spin down cost.

5. A power saving control method, comprising the steps of:

retaining the history of the input/output data amount between a main unit of computer system and an information storage device in an input/output data amount history storage means;

obtaining a period X, which is grater than zero, in which a variation in the input/output data amount repeats a given pattern on the basis of the history of the input/output data amount retained in said input/output data amount history storage means by power management control means with respect to said information storage device;

judging whether or not the input/output data amount is zero during a period from a time (C−X) till a time (C−X+Z) obtained from the period X, the present time C and a seperate spin down cost Z, with reference to said input/output data amount history storage means; and changing over from the present mode of said information storage device to a power saving mode when the input/output data amount is zero.

6. The power saving control method according to claim 5, comprising the steps of:

obtaining an active ratio indicative of a ratio of access to said information storage device with respect to the operating period of time of a main unit of computer system;

judging whether the active ratio is within a given range determined by application software adaptation, or not;

judging that the variation of the input/output data amount repeats the given pattern if the active ratio is within the given range; and changing over from the present mode of said information storage device to the power saving mode.

7. The power saving control method according to claim 5, wherein:

the sampling interval Y at which the input/output data amount is stored in said input/output data amount history recording means is set to ½ or less of the spin down cost Z.

8. A recording medium for storing power saving 5 control program, comprising the steps of:

retaining the history of the input/output data amount between a main unit of computer system and an information storage device in an input/output data amount history storage means;

obtaining a period X, which is grater than zero, in which a variation in the input/output data amount repeats a given pattern on the basis of the history of the input/output data amount retained in said input/output data amount history storage means by power management control means with respect to said information storage device;

judging whether or not the input/output data amount is zero during a period of from a time (C−X) till a time (C−X+Z) obtained from the period X, the present time C and a seperate spin down cost Z, with reference to said input/output data amount history storage means; and changing over from the present mode of said information storage device to a power saving mode when the input/output data amount is zero.

9. The recording medium for storing power saving control program according to claim 8, comprising the steps of:

obtaining an active ratio indicative of a ratio of access to said information storage device with respect to the operating period of time of a main unit of computer system;

judging whether or not the active ratio is within a given range determined by application software adaptation;

judging that the variation of the input/output data amount repeats the given pattern if the active ratio is within the given range; and changing over from the present mode of said information storage device to the power saving mode.

* * * * *